Figure 1:
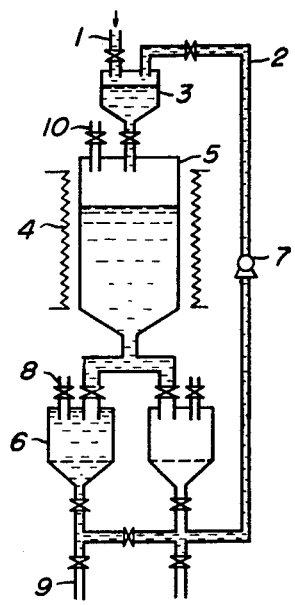

3,155,493
METHOD FOR MANUFACTURING HIGH PURITY ALUMINUM

Ryoma Tanaka, Juntaro Yurimoto, and Hirosuke Ryu, Niihama-shi, and Yuji Shioji, Hirakata-shi, Japan, assignors to Sumitomo Chemical Company, Ltd., Osaka, Japan, a corporation of Japan
Filed Aug. 7, 1961, Ser. No. 129,625
Claims priority, application Japan, Aug. 12, 1960, 35/34,840
8 Claims. (Cl. 75—68)

This invention relates to the method for manufacturing high purity aluminum. More particularly, it relates to the method for manufacturing high purity aluminum, together with an olefin and hydrogen, by thermal decomposition or pyrolysis of an alkylaluminum compound having the general formula of $(RR'CH\text{—}CH_2)_2AlX$, wherein R and R' are respectively selected from alkyl radicals and X is selected from the group consisting of $$RR'CH\text{—}CH_2\text{—}$$

radical and hydrogen atom, in a hydrocarbon medium.

K. Ziegler et al. have suggested a method for manufacturing high purity aluminum by thermal decomposition or pyrolysis of alkylaluminum compounds. (See, for example, Angew. Chem., vol. 67, No. 16, pages 424–425 (1955); British Patent No. 788,619; Japanese Patent Publication No. SHO 32–2454.) According to their method, the single alkylaluminum compound is merely decomposed by heating in the liquid state. In such method, however, it is extremely difficult to recover, wash and dry the deposited aluminum in the complete absence of air to obtain the final product. This is true especially when the continuous process is contemplated.

When the decomposition is effected in vacuo in the gaseous state according to their method, there are also some difficulties from technical and economical points of view, in maintaining the apparatus of commercial scale in a vacuum state. Thus, leakage of a larger amount of air tends to cause danger of inflammation of the alkylaluminum compound, and leakage of even a smaller amount of air tends to lower the purity of aluminum due to formation of byproducts, such as aluminum carbide, as set forth in the following Table 1.

TABLE 1

| | | | | |
|---|---|---|---|---|
| Air content in the gaseous atmosphere (Percent) | 0.0 | 5.0 | 10.0 | 25.0 |
| Aluninim carbide content in the metal produced (Percent) | 0.0 | 1.2 | 2.0 | 8.9 |

K. Ziegler et al. have also suggested an attempt to accomplish the same effects as in the gaseous state decomposition by blowing a larger amount of hydrogen into an alkylaluminum compound and deriving the vapor of said compound accompanied with the hydrogen onto a heated surface to cause the decomposition. According to this attempt, however, a part of the alkylaluminum compound is not avoidable from denaturization, which seems to be caused by oxygen or moisture included in the hydrogen in an unavoidably minute amount, to form denatured alkylaluminum compounds which could not isolate aluminum.

In these gaseous state decomposition methods, also, continuous separation of the resulting aluminum is much difficult, because the aluminum is deposited on a heated surface and forms a film or a mirror which is difficultly removed. Besides, the heat conductivity becomes worse by such film or mirror as time elapses, thereby the heat control becoming difficult.

Furthermore, K. Ziegler et al. have suggested possibility of a continuous operation by blowing the vapor of an alkylaluminum compound onto the surface of molten aluminum, whereby permitting the decomposition of the compound on the liquid aluminum, and taking out the increment directly from the molten aluminum. It is, however, apparent from the old publications that there might occur a thermal cracking reaction of the olefin produced, which may cause contamination of carbon in the aluminum, or other unfavorable side reactions, at such temperature as aluminum is molten, i.e. about 700° C. or higher. (See, for example, G. Egloff; "The Reactions of Pure Hydrocarbons," pages 336–340 (1937).) Thus, this method could not give sufficiently pure aluminum with favorable yield.

As mentioned above, the conventional methods of thermal decomposition of alkylaluminum compounds have not succeeded in continuous production of high purity aluminum in commercial scale with easy and economical procedure.

Now, the present inventors have discovered that the disadvantages in the conventional methods as mentioned above could be avoided by carrying out the thermal decomposition of an alkylaluminum compound in a hydrocarbon medium.

Thus, an object of the invention is to provide such method for manufacturing high purity aluminum, as can easily be applicable to a continuous process. Another object is to provide a method for manufacturing aluminum of much higher purity than that obtained by the conventional methods as described above, in an easily separable form. Still another object is to provide such method that is carried out under the easily controllable and moderate conditions. Other objects and advantages would be apparent from the following description.

To accomplish these objects, the present invention provides a method for manufacturing high purity aluminum, which comprises heating an alkylaluminum compound having the general formula of $(RR'CH\text{—}CH_2)_2AlX$, wherein R and R' are respectively selected from alkyl radicals, and X is selected from the group consisting of $RR'CH\text{—}CH_2\text{—}$ radical and hydrogen atom, up to a temperature at which said compound is decomposed, in a hydrocarbon medium which is liquid at said temperature and has the boiling point higher than said temperature.

The medium employed in the invention should be able to dissolve at least a part of the alkylaluminum compound, should have the boiling point higher than the temperature at which said compound is decomposed, and should have a sufficient thermal stability at that temperature. Thus, any of hydrocarbon media may be employed, so far as it is liquid at the temperature of the decomposition. As examples of the medium, any of aliphatic, alicyclic and aromatic hydrocarbons, or a mixture thereof, such as various petroleum fractions boiling at above about 200° C., paraffin oil, alkylbenzenes having the boiling point higher than 200° C., alkylnaphthalenes, diphenyl and the like, may be mentioned.

Among the alkylaluminum compounds to be decomposed according to the invention and having the general formula of $(RR'CH\text{—}CH_2)_2AlX$, wherein R, R' and X have the same meanings as identified above, triisobutylaluminum and diisobutylaluminum hydride (i.e. both of R and R' are methyl radical), as well as a mixture thereof, are the most favorable. As other examples, R and R' radicals which may be the same or different from each other may be ethyl, propyl, or any of other higher alkyl radicals. More particularly, tri-(2-methylbutyl)aluminum and tri-(2-methyl-pentyl)aluminum, as well as the dialkylaluminum hydrides corresponding to them, may be mentioned.

To effect the method of the invention, the alkylaluminum compound is heated to a temperature at which said compound is decomposed in the hydrocarbon medium.

In general, a mixture of the alkylaluminum compound and the hydrocarbon medium is heated to a temperature at which said compound is decomposed. The alkylaluminum compound is ordinarily soluble in the hydrocarbon medium, so that the alkylaluminum compound is thermally decomposed in the form of a solution in the hydrocarbon medium. But, it may be decomposed in the form of a dispersion in the medium with higher concentration than its solubility, if desired. Thus, the mixture to be heated according to the invention may contain not less than about 2% and not more than about 50%, by weight, more preferably 5% to 20%, of the alkylaluminum compound.

Alternatively, the alkylaluminum compound may be added to the hydrocarbon medium heated to a temperature at which said compound is decomposed, thereby the added compound is readily decomposed and isolates aluminum in the medium.

In any way, the alkylaluminum compound is to be heated to a temperature at which the compound is decomposed. The temperature somewhat varies depending upon the reaction condition. In general, the decomposition reaction of the invention starts from about 200° C., but the heating temperature may preferably be selected within the range from about 220° to 250° C., depending upon the kind of the hydrocarbon medium employed and other reaction conditions. While the heating temperature of above 300° C. is to be avoided, since unfavorable by-products may be formed at such temperature.

If desired, the decomposition reaction may be effected under reflux condition of the medium. For that purpose, a hydrocarbon medium having a boiling point of about 200° to 250° C. may be employed.

Upon heating the alkylaluminum compound up to the decomposition temperature, aluminum is readily isolated in the medium and, at the same time, olefin and hydrogen gas are generated. A part of the aluminum is dispersed in the medium, and the other is adhered on the wall of reactor so weakly that it can easily be stripped off in the medium by a simple mechanical operation, such as by stirring or by giving a shock to the reactor. The aluminum isolated may be separated by any known procedure, such as by filtration, or by taking out from the reaction mixture, leaving the medium. The aluminum can be formed in any particle size from finely divided gray powder to lustrous granules or grains of a few millimeters of diameter according to the conditions of the decomposition, but too fine powder is not so preferable for the effective filtration.

In some cases, it is advantageous to preliminarily seed finely divided aluminum powders in the mixture to be decomposed. This serves for formation of aluminum of comparatively larger and uniform particle size without adhering onto the wall of reactor.

Although the method of the invention may be conducted by the batch system, the features of the invention are better displayed by the continuous operation. In this case, a mixture of the alkylaluminum compound and the hydrocarbon medium, may be continuously fed to a reactor and heated to the above-mentioned temperature. The aluminum isolated in the course of the reaction is continuously filtered to be separated from the hydrocarbon medium, while the latter is advantageously recycled to mix with the alkylaluminum compound. Or, the alkylaluminum compound may be dropped continuously into the heated hydrocarbon medium, and the isolated aluminum is continuously filtered for separation from the hydrocarbon medium, while the latter is advantageously recycled to feed to the reactor. If desired, the isolated aluminum may be continuously taken out, leaving the medium in the reactor.

During the decomposition reaction, olefin and hydrogen gas are generated. The olefin has correspondingly the formula of $RR'C=CH_2$, wherein $R$ and $R'$ are the same radicals as in the material alkylaluminum compound. The amounts of the generated olefin and hydrogen gas are almost quantitative, and they are advantageously reused as the materials for preparation of alkylaluminum compounds.

If desired, the decomposition reaction of the invention is advantageously carried out under introduction of an inert gas, such as hydrogen and argon, to drive the generated olefin gas out of the reaction mixture, thereby to accelerate the decomposition reaction. Furthermore, exhaustion of the generated gas mixture can be helped by carrying out the reaction under a weak subatmospheric pressure.

According to this invention, it is possible to wholly exclude affections of the atmosphere in the reaction vessel, namely injurious effects of oxygen and moisture, thereby to prevent occurrence of unfavorable side reactions, such as formation of aluminum hydroxide, aluminum carbide, aluminum alkoxide compounds, and others, and to avoid impurification of the isolated aluminum, since the alkylaluminum compound is decomposed in the state of a solution or a dispersion in the medium, either in the case of heating a solution or a dispersion of the compound, or in the case of dropping or spraying the compound into the medium.

Aluminum produced according to this invention exhibits a purity of 99.99% or higher, as shown in the following Table 2, which purity is comparable with that of high purity aluminum produced in commercial scale now.

TABLE 2

| Component | Fe | Si | Cu | Al |
| --- | --- | --- | --- | --- |
| Composition (Percent) | 0.001 | 0.002 | Trace | 99.997 |

Besides, the decomposition of the compound in the state of a solution or a dispersion according to the present invention makes the reaction moderate, makes the control of the reaction temperature easy, in spite of this reaction being considerably endothermic, and permits to avoid occurrence of side reactions caused by a rapid change of the temperature or a partial superheating.

The method of the invention would be further described with respect to the attached drawings, which set forth preferable embodiments of apparatus to carry out the method in continuous way.

Apparatus shown in FIGURE 1 is suitable in case where a hydrocarbon medium has a comparatively higher dissolving power to an alkylaluminum compound. An alkyl-aluminum compound to be decomposed and a recycled hydrocarbon medium are introduced into the mixer 3 through the inlet pipes 1 and 2, respectively, to form a uniform mixture. The charging proportion of the two materials is adjusted by means of controlling valves installed at the respective inlet pipes, so as to keep the concentration of alkylaluminum compound at a desired degree.

The mixture is continuously fed into the reactor 5 heated by the suitable heater 4, where the alkylaluminum is thermally decomposed. The isolated aluminum is sent along with the flow of the liquid to one of the two filters 6 installed in parallel, where the aluminum is filtered to be separated from the hydrocarbon medium. The medium taken out of the bottom of the filter may be poured to the mixer 3 through the inlet pipe 2 via the pump 7. Gas mixture generated during the decomposition is exhausted through an outlet pipe 10. When a sufficient amount of aluminum is separated in the filter which is being operated now, that filter is changed to the other filter. The medium in the first filter is flown out through the outlet pipe 9 by sending an inert gas to the filter through the inlet pipe 8, and, thereafter, a lower boiling hydrocarbon solvent, such as n-hexane, is poured through the inlet pipe 8 to the filter to remove the medium adhered to the aluminum by washing, followed by recovery of the aluminum. In the said way, aluminum can be taken out exceedingly easily by alternative use of the two filters, thus the charge of the materials, the decomposition reaction and the separation of aluminum can be carried out continuously. In this operation, the reaction conditions are advantageously so selected that aluminum is isolated in the form of sponge-like granules or grains in order to make the filtration of the aluminum easier.

Figure 2:
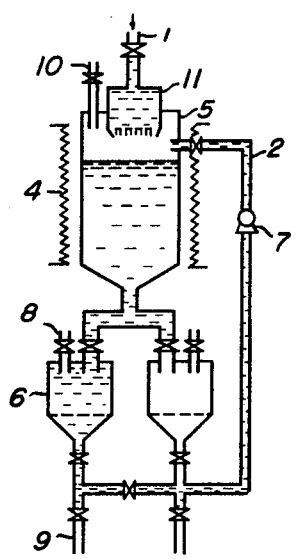

In apparatus shown in FIGURE 2, an alkylaluminum compound is introduced into the distributor 11, which has a number of nozzles at the bottom, through the inlet tube 1, and is dropped or sprayed into a hydrocarbon medium which fills the reactor 5 and is heated by a suitable heater 4. The aluminum isolated in the medium through decomposition of the added alkylaluminum compound is recovered by filtration with the same manner as in the apparatus of FIGURE 1. The medium separated is recycled and reused by sending to the reactor via the pump 7. The alkylaluminum compound is easily dispersed uniformly in the medium, since the medium is moving inside the reactor, so that no side reaction is brought about. In other words, the apparatus in FIGURE 2 displays the same effects as in the apparatus in FIGURE 1 without a mixer. The apparatus in FIGURE 2 would be suitable in a case where the hydrocarbon medium has comparatively lower dissolving power to the alkylaluminum compound.

The invention will more fully be described with respect to the following examples, which, however, is set forth merely by way of illustration and not by way of limitation.

*Example 1*

Twenty and a half grams of triisobutylaluminum and 194.1 g. of a higher boiling fraction (150–200° C./3 mm. Hg) of liquid paraffin were mixed in nitrogen atmosphere. The mixture was charged under nitrogen atmosphere into a long neck flask having a thermometer and an outlet glass tube for decomposition gas. The flask was heated gradually at the bottom by means of a flask-heater to keep the temperature of the mixture at 250° C. for 30 min. The alkylaluminum compound was decomposed with generation of a gas mixture, and aluminum isolated in grey granular form in the reaction mixture was separated by filtration. The yield of aluminum and that of the gas were 2.8 g. and 10.4 l. (at 0° C. and 1 atm.) respectively, the composition of the gas being 66.3% of isobutylene, 32.7% of hydrogen, and 1.0% of isobutane.

*Example 2*

Seventy-one and a tenth grams of diisobutylaluminum hydride and 715.4 g. of higher boiling fraction (150–200° C./3 mm. Hg) of liquid paraffin were mixed in nitrogen atmosphere. The mixture was charged under nitrogen atmosphere into a three-necked flask having a thermometer, an outlet glass tube for decomposition gas and a stirrer. To the mixture, 1.4 g. of 60 to 100 mesh powdered aluminum was added under nitrogen atmosphere. The flask was heated gradually at the bottom by means of a flask-heater to keep the temperature of the mixture at 230° C. for 1 hour, while being well stirred so as to keep the powdered aluminum in good suspension. The dissobutylaluminum hydride was decomposed with generation of a gas mixture, and aluminum was isolated in the reaction mixture in the form of granules, which have a metallic lustre and have comparatively uniform particle sizes, without being adhered onto the wall of the reactor.

The yield of aluminum and that of gas were 14.7 g. (including the preliminarily added powdered aluminum) and 38.8 l. (at 0° C. and 1 atm.) respectively, the composition of the gas being 57.0% of isobutylene, 42.6% of hydrogen, and 0.4% of isobutane.

*Example 3*

The space portion of the apparatus shown in FIG. 1 was substituted with nitrogen atmosphere. The recycling n-octylbenzene was introduced into the mixer 3 through the inlet pipe 2 at the rate of 91 g./min., while triisobutylaluminum was charged to the mixer through the inlet pipe 1 at the rate of 4.5 g./min., the both components being mixed in the mixer. The mixture was continuously introduced into the reactor 5 heated to 230° C., whereby the alkylaluminum compound was decomposed to isolate granular aluminum having slightly metallic lustre in the medium. The aluminum was sent to the filter 6 along with the flow of the medium, where it is filtered and separated from the medium. The filtrate was returned back to the mixer by the pump 7. The amount of the gas generated in the course of the decomposition was measured with a gas meter connected to the outlet pipe 10.

Aluminum isolation velocity _____ g./min__ 0.61
Gas generation velocity _____ l./min__ 2.3
Gas composition:
    Isobutylene _____ percent__ 67.0
    Hydrogen _____ do____ 32.0
    Isobutane _____ do____ 1.0

*Example 4*

The space portion of the apparatus shown in FIG. 2 was substituted with nitrogen atmosphere. A petroleum fraction (150–200° C./2 mm. Hg) was recyclically introduced to the reactor 5 by means of the pump 7 through the inlet pipe 2 at the rate of 80 g./min. Triisobutylaluminum was dropped into the reactor 5 heated to 250° C. through the distributor 11 via the inlet pipe 1 at the rate of 4.0 g./min., thereby to isolate granular, silver white aluminum. The isolated aluminum and the gas generated in the course of the decomposition were treated as in Example 3.

Aluminum isolation velocity _____ g./min.__ 0.55
Gas generation velocity _____ l./min__ 2.0
Gas composition:
    Isobutylene _____ percent__ 66.0
    Hydrogen _____ do____ 33.2
    Isobutane _____ do____ 0.8

What we claim is:

1. A method for manufacturing high purity aluminum, which comprises decomposing an alkylaluminum compound having the general formula of $$(RR'CH\text{---}CH_2)_2AlX$$

wherein R and R' are respectively selected from alkyl radicals, and X is selected from the group consisting of hydrogen and RR'CH—CH$_2$— wherein R and R' each represent alkyl, by heating said compound, up to a temperature ranging from 200° C. to 300° C. and at which said compound is decomposed, in an inert hydrocarbon medium which is liquid at said temperature and has a boiling point higher than said temperature, thereby to decompose said alkylaluminum compound into metallic aluminum, hydrogen and olefin represented by the formula RR'C=CH$_2$ wherein R and R' have the same meaning as in the formula of said alkylaluminum compound, and separating the resulting aluminum from the hydrocarbon medium.

2. A method according to the claim 1, wherein said alkylaluminum compound is at least one member of the class consisting of triisobutylaluminum and diisobutylaluminum hydride.

3. A method according to the claim 1, wherein said hydrocarbon medium contains seed aluminum powder.

4. A method for continuously manufacturing high purity aluminum, which comprises continuously introducing a mixture of an alkylaluminum compound having the general formula of (RR'CH—CH$_2$)$_2$AlX, wherein R and R' are respectively selected from alkyl radicals, and X is selected from the group consisting of H— and RR'CH—CH$_2$— wherein R and R' each represent alkyl, with an inert hydrocarbon medium into a heating zone heated to a temperature ranging from 200° C. to 300° C. and, said medium being liquid at said temperature and having a boiling point higher than said temperature, thereby decomposing said alkylaluminum compound into aluminum, hydrogen and olefine represented by the formula $RR'C=CH_2$ wherein R and R' have the same meaning as in the formula of said alkylaluminum compound, continuously separating the resulting aluminum from the hydrocarbon medium, and recycling the separated hydrocarbon medium to form the mixture with a fresh alkylaluminum compound.

5. A method according to the claim 4, wherein said mixture contains not less than about 2% and not more than about 50%, by weight, of the alkylaluminum compound.

6. A method according to the claim 4, wherein said alkylaluminum compound is at least one member of the class consisting of triisobutylaluminum and diisobutylaluminum hydride.

7. A method for continuously manufacturing high purity aluminum, which comprises continuously adding an alkylaluminum compound having the general formula of $(RR'CH-CH_2)_2AlX$, wherein R and R' are respectively selected from alkyl radicals, and X is selected from the group consisting of H— and $RR'CH-CH_2$— wherein R and R' each represent alkyl, to an inert hydrocarbon medium heated at a heating zone to a temperature ranging from 200° C. to 300° C. and at which said compound is decomposed, said medium being liquid at said temperature and having a boiling point higher than said temperature, thereby decomposing said alkylaluminum compound into metallic aluminum, hydrogen and olefin represented by the formula $RR'C=CH_2$ wherein R and R' have the same meaning as in the formula of said alkylaluminum compound, continuously separating the resulting aluminum from the hydrocarbon medium, and recycling the separated hydrocarbon medium to the heating zone.

8. A method according to the claim 7, wherein said alkylaluminum compound is at least one member of the class consisting of triisobutylaluminum and diisobutylaluminum hydride.

References Cited in the file of this patent

UNITED STATES PATENTS

| | | |
|---|---|---|
| 2,767,082 | Roy | Oct. 16, 1956 |
| 2,791,499 | Clegg | May 7, 1957 |
| 2,843,474 | Ziegler | July 15, 1958 |
| 2,921,876 | Dobratz | Jan. 19, 1960 |